US 10,320,995 B2

(12) United States Patent
Nakamura

(10) Patent No.: US 10,320,995 B2
(45) Date of Patent: Jun. 11, 2019

(54) COMMUNICATION SYSTEM, COMMUNICATION APPARATUS, AND COMMUNICATION CONNECTION METHOD

(71) Applicant: Sharp Kabushiki Kaisha, Osaka-shi, Osaka (JP)

(72) Inventor: Hiroaki Nakamura, Osaka (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 917 days.

(21) Appl. No.: 14/514,649

(22) Filed: Oct. 15, 2014

(65) Prior Publication Data
US 2015/0113061 A1    Apr. 23, 2015

(30) Foreign Application Priority Data

Oct. 17, 2013 (JP) .................. 2013-216690

(51) Int. Cl.
*H04W 76/10* (2018.01)
*H04N 1/00* (2006.01)
*H04L 29/08* (2006.01)
*H04W 4/80* (2018.01)

(52) U.S. Cl.
CPC ....... *H04N 1/00328* (2013.01); *H04L 67/104* (2013.01); *H04L 67/14* (2013.01); *H04N 1/00129* (2013.01); *H04N 1/00204* (2013.01); *H04W 4/80* (2018.02); *H04W 76/10* (2018.02)

(58) Field of Classification Search
CPC .................................................... H04W 76/02
USPC ........................................................ 709/204
See application file for complete search history.

(56) References Cited

U.S. PATENT DOCUMENTS

| 2005/0279833 | A1  | 12/2005 | Tanaka |
| 2007/0040893 | A1  | 2/2007  | Kawakami et al. |
| 2008/0027817 | A1* | 1/2008  | Iizaka ................. G06Q 20/201 705/20 |
| 2013/0117834 | A1* | 5/2013  | Ishioka ............... H04L 63/0869 726/7 |
| 2016/0134737 | A1* | 5/2016  | Pulletikurty .......... G06F 3/0227 715/735 |

FOREIGN PATENT DOCUMENTS

| CN | 102789463 A  | 11/2012 |
| JP | 2006-1063 A  | 1/2006  |
| JP | 2006-352577 A | 12/2006 |
| JP | 2012170051 A | 9/2012  |
| JP | 2013-115828 A | 6/2013  |

* cited by examiner

Primary Examiner — Vivek Srivastava
Assistant Examiner — Sibte H Bukhari
(74) Attorney, Agent, or Firm — Keating & Bennett, LLP

(57) ABSTRACT

A user causes a portable device (information processing device) to approach one PC (communication apparatus), and the PC transfers to the portable device by means of NFC unique connection information, such as a password, required for communication connection. Also, the user causes the portable device which has obtained the connection information to approach another PC. The portable device transfers connection information unique to the one PC to another PC by means of NFC. Another PC uses the obtained connection information to execute communication connection with the one PC. Thus, connection information required for communication connection is transferred among a plurality of PCs so as to easily execute communication connection among the plurality of PCs.

6 Claims, 15 Drawing Sheets

COMMUNICATION SYSTEM, COMMUNICATION APPARATUS, AND COMMUNICATION CONNECTION METHOD

CROSS-REFERENCE TO RELATED APPLICATIONS

This non-provisional application claims priority under 35 U.S.C. § 119(a) on Patent Application No. 2013-216690 filed in Japan on Oct. 17, 2013, the entire contents of which are hereby incorporated by reference.

BACKGROUND

1. Technical Field

The present invention relates to a communication system which executes communication connection among a plurality of communication apparatuses, a communication apparatus, and a communication connection method.

2. Description of Related art

Conventionally, a communication system is used in which a plurality of communication apparatuses, such as a PC (personal computer) or a display apparatus, are connected to a communication network, and exchange data via the communication network. The communication system is a video conference system, for example. In order for a communication apparatus to execute communication connection with another communication apparatus in the communication system, information unique to a communication apparatus of a communicating end is needed such as a PC name, an IP (Internet Protocol) address, or a password. Conventionally, a user checks information unique to a communication apparatus of a communicating end required for communication connection, and manually inputs the checked information to a communication apparatus. Japanese Patent Application Laid-Open No. 2013-115828 describes that information required for communication connection is transmitted/received by means of NFC (Near Field Communication), thereby communication connection is executed between a communication apparatus and a portable terminal.

SUMMARY OF THE INVENTION

There is a problem that the conventional method of manually inputting information required for communication connection to a communication apparatus requires time and effort. Moreover, in order to check information unique to a communication apparatus of a communicating end required for communication connection and to input the checked information to a communication apparatus, a user has to have a certain degree of knowledge. For this reason, it is difficult for some users to perform a task of communication connection. Although Japanese Patent Application Laid-Open No. 2013-115828 describes that communication connection is executed between a communication apparatus and a portable terminal, a technique of easily executing communication connection among a plurality of communication apparatuses is not known.

The present invention has been made in consideration of such a situation, and an object thereof is to provide a communication system which can easily execute communication connection among a plurality of communication apparatuses, a communication apparatus, and a communication connection method.

The communication system according to the present invention is a communication system, comprising: a plurality of communication apparatuses; and a portable-type information processing device, wherein one communication apparatus includes: a first storage section storing connection information unique to the one communication apparatus required for another communication apparatus of the plurality of communication apparatuses to execute communication connection; and a first output section for outputting the connection information stored in the first storage section to the information processing device in a non-contact manner, the information processing device includes: a first obtaining section for obtaining the connection information outputted from the one communication apparatus; a second storage section for storing the connection information obtained by the first obtaining section; and a second output section for outputting the connection information stored in the second storage section to said another communication apparatus in a non-contact manner, and said another communication apparatus includes: a second obtaining section for obtaining the connection information outputted from the information processing device; and a communication connection section for using the connection information obtained by the second obtaining section to execute communication connection with the one communication apparatus.

In the communication system according to the present invention, the first output section transmits the connection information to the information processing device by means of short-range wireless communication, and the first obtaining section receives the connection information from the one communication apparatus by means of short-range wireless communication.

In the communication system according to the present invention, the one communication apparatus further includes a display section, the first output section causes the display section to display a graphic code representing the connection information in a graphic pattern, the information processing device further includes a camera section, and the first obtaining section accepts a graphic code captured by the camera section, and decodes the graphic code.

In the communication system according to the present invention, the one communication apparatus further includes an image recording section for recording an image on a sheet, the first output section causes the image recording section to record a graphic code representing the connection information in a graphic pattern, the information processing device further includes a camera section, and the first obtaining section accepts a graphic code captured by the camera section, and decodes the graphic code.

In the communication system according to the present invention, the second output section transmits the connection information to said another communication apparatus by means of short-range wireless communication, and the second obtaining section receives the connection information from the information processing device by means of short-range wireless communication.

In the communication system according to the present invention, the information processing device further includes a display section, the second output section causes the display section to display a graphic code representing the connection information in a graphic pattern, said another communication apparatus further includes a camera section, and the second obtaining section accepts a graphic code captured by the camera section, and decodes the graphic code.

The communication apparatus according to the present invention is a communication apparatus, comprising: a storage section storing connection information unique to the communication apparatus itself required for another communication apparatus to execute communication connection; an output section for outputting the connection information stored in the storage section to an external portable-type information processing device in a non-contact manner; an obtaining section for obtaining connection information unique to said another communication apparatus and outputted from the information processing device; and a communication connection section for using the connection information obtained by the obtaining section to execute communication connection with said another communication apparatus.

In the method of executing communication connection among a plurality of communication apparatuses according to the present invention, the method comprises: a step of one communication apparatus outputting connection information unique to the one communication apparatus required for another communication apparatus of the plurality of communication apparatuses to execute communication connection, to a portable-type information processing device in a non-contact manner; a step of the information processing device obtaining the connection information outputted from the one communication apparatus; a step of the information processing device storing the obtained connection information; a step of the information processing device outputting the stored connection information to said another communication apparatus in a non-contact manner; a step of said another communication apparatus obtaining the connection information outputted from the information processing device; and a step of said another communication apparatus using the obtained connection information to execute communication connection with the one communication apparatus.

According to the present invention, connection information required for communication connection among a plurality of communication apparatuses is transferred from one communication apparatus to a portable-type information processing device, and is transferred from the information processing device to another communication apparatus. For this reason, time and effort required to input connection information are reduced. Moreover, a user can perform a task of communication connection without having knowledge about connection information. Accordingly, the present invention brings about an outstanding effect, such as communication connection can be easily executed among a plurality of communications apparatuses.

The above and further objects and features of the invention will more fully be apparent from the following detailed description with accompanying drawings.

DETAILED DESCRIPTION

Hereinafter, the present invention will be described in detail with reference to the drawings showing Embodiments thereof.

(Embodiment 1)

Figure 1:
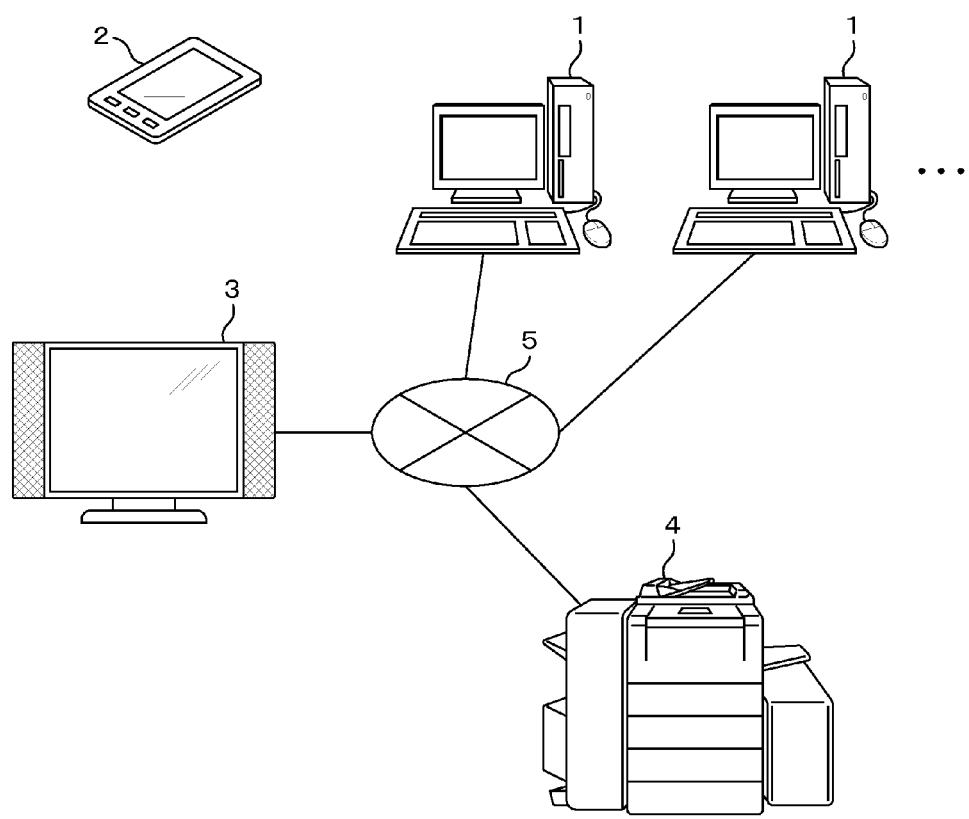
FIG. 1 is a conceptual diagram showing a configuration of a communication system according to Embodiment 1.

FIG. 1 is a conceptual diagram showing a configuration of a communication system according to Embodiment 1. A plurality of PCs 1 are connected to a communication network 5, such as a LAN (Local Area Network), and a display apparatus 3 and an image processing apparatus 4 are also connected to the communication network 5. The image processing apparatus 4 is a multi-function peripheral provided with functions of a scanner and a copying machine. The PC 1, the display apparatus 3 and the image processing apparatus 4 correspond to a communication apparatus of the present invention, respectively. A part or the whole of the communication network 5 may be a wireless communication network. The communication system further comprises a portable device 2. The portable device 2 is a portable telephone or a smart phone, for example. The portable device 2 corresponds to a portable-type information processing device of the present invention. In the communication system, connection information required to execute communication connection among communication apparatuses is exchanged by means of the portable device 2, and the communication connection is executed from one communication apparatus to another communication apparatus by use of the exchanged connection information.

Figure 2:
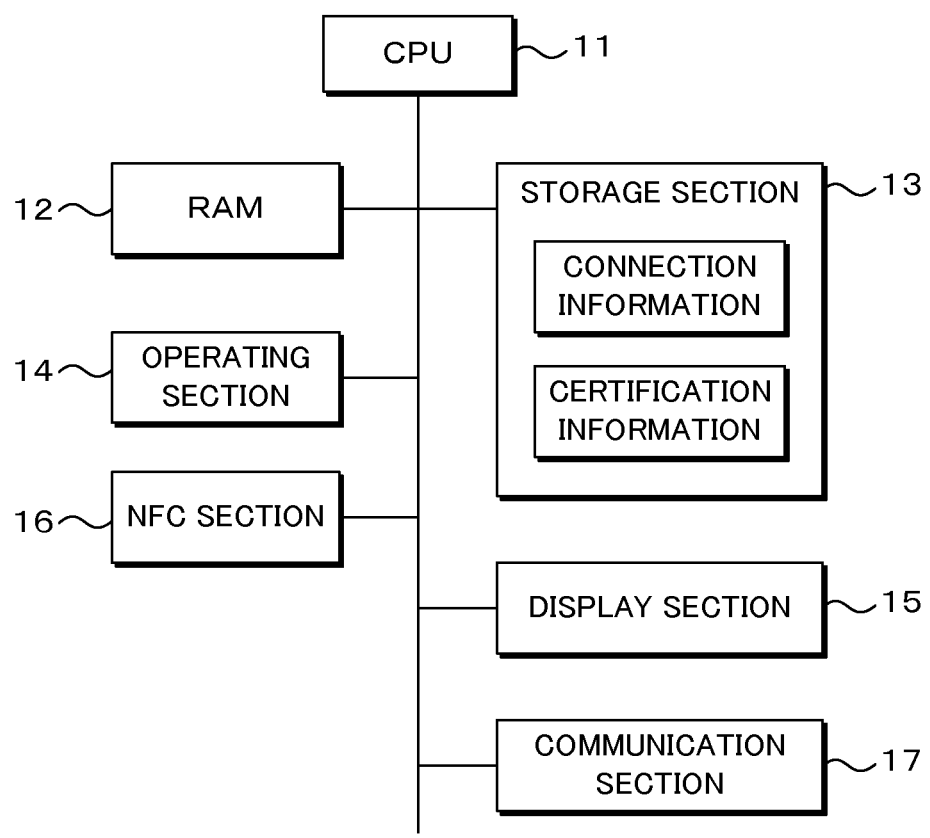
FIG. 2 is a block diagram showing an internal configuration of a PC according to Embodiment 1.

FIG. 2 is a block diagram showing an internal configuration of the PC 1 according to Embodiment 1. The PC 1 comprises a CPU (Central Processing Unit) 11 which executes calculations, a RAM (Random Access Memory) 12 which stores temporary information to be created in association with the calculations, and a storage section 13, such as a hard disk. The storage section 13 stores a computer program, the computer program is loaded from the storage section 13 to the RAM 12 if necessary, and the CPU 11 executes a process required for the PC 1 based on the loaded computer program. Moreover, the PC 1 comprises an operating section 14, such as a keyboard, which accepts an operation from a user, a display section 15 which displays an image by means of a display device, such as a liquid crystal panel, and a communication section 17 which communicates via the communication network 5. Furthermore, the PC 1 comprises an NFC (Near Field Communication) section 16 which communicates by wireless by means of NFC. The NFC corresponds to short-range wireless communication of the present invention. The NFC section 16 includes an antenna for NFC and a signal processing section. The PC 1 causes the NFC section 16 to transmit/receive data to/from the portable device 2 by means of NFC. For example, the NFC section 16 is a data reader/writer by means of NFC.

The storage section 13 stores connection information unique to the PC 1, which is required to execute communication connection from another communication apparatus to the PC 1. The connection information is an IP address of the PC 1, a computer name of the PC 1, a folder name of a folder configured in the storage section 13 so that it is accessible from another communication apparatus, and a password, for example. The storage section 13 stores certification information unique to the portable device 2, which is required to authenticate the portable device 2 at the time of communication with the portable device 2 by means of NFC. The certification information is an ID and a password, for example.

Figure 3:
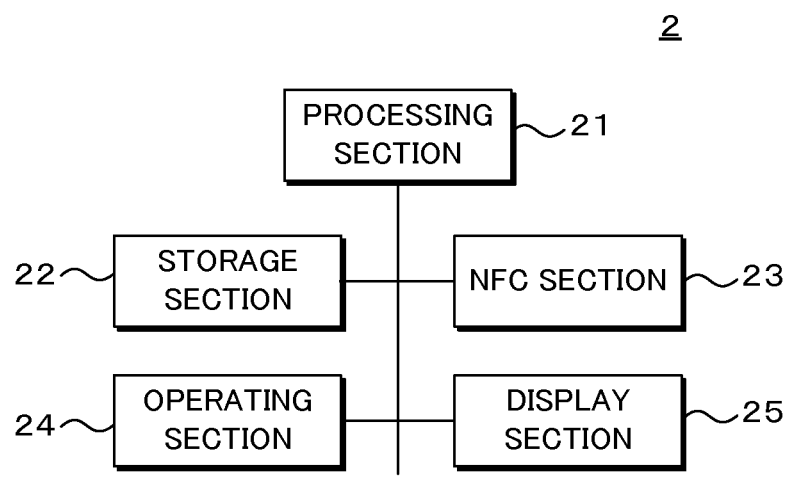
FIG. 3 is a block diagram showing an internal configuration of a portable device according to Embodiment 1.

FIG. 3 is a block diagram showing an internal configuration of the portable device 2 according to Embodiment 1. The portable device 2 comprises a processing section 21 which processes information required for the portable device 2. The processing section 21 includes a calculating section which executes calculations, a RAM which stores information associated with the calculations, a memory which stores programs required for the calculations, and the like. The processing section 21 may be configured by a plurality of parts. The portable device 2 further comprises a storage section 22 which stores information, an operating section 24, such as a touch panel or a numeric keypad, which accepts an input instruction from a user, and a display section 25 which displays an image by means of a display device, such as a liquid crystal panel. The portable device 2 further comprises an NFC section 23 which communicates by wireless by means of NFC. The NFC section 23 includes an antenna for NFC and a signal processing section. The storage section 22 stores certification information unique to the portable device 2, which is required to communicate with a communication apparatus by means of NFC.

Figure 4:
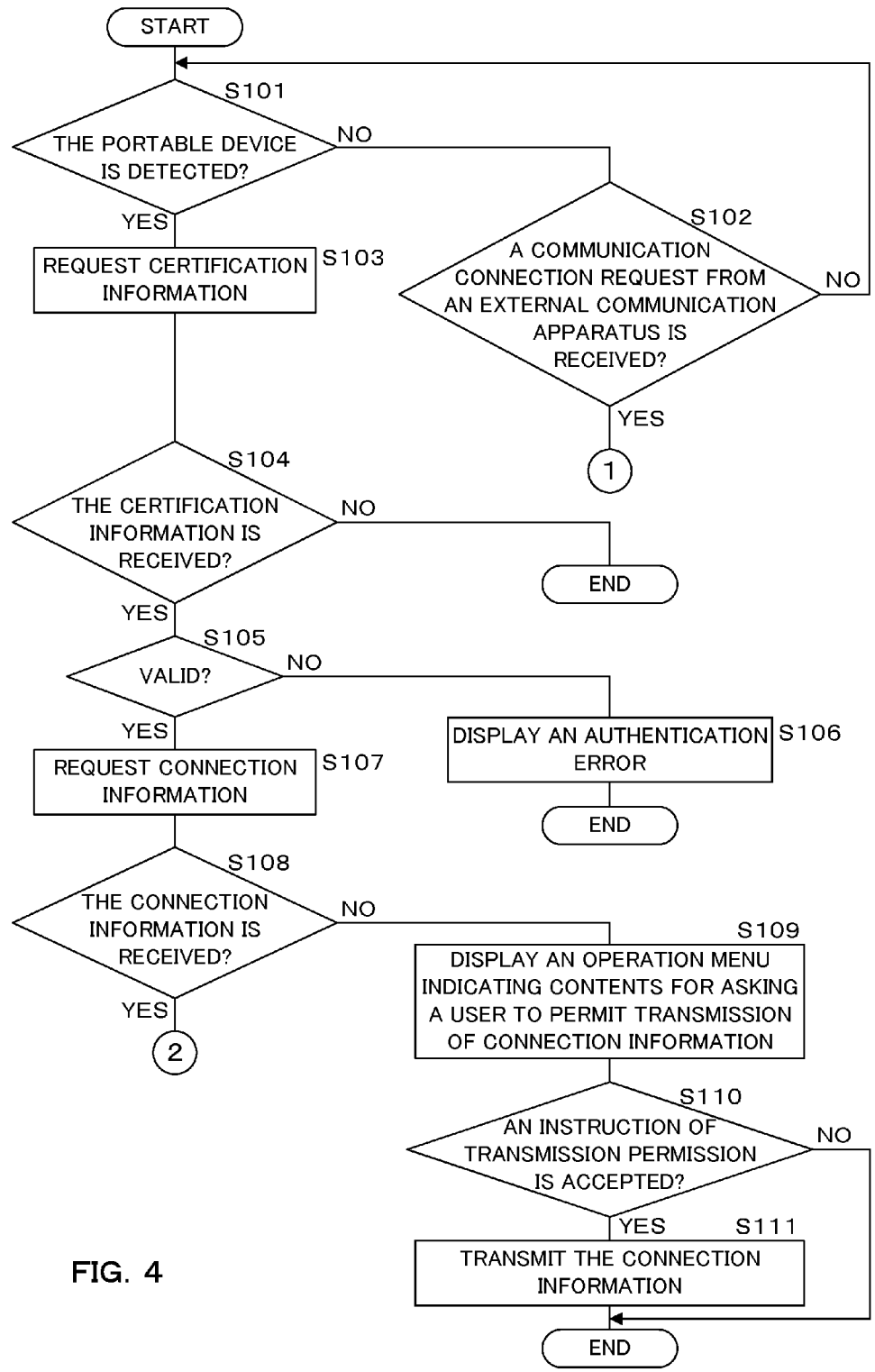
FIG. 4 is a flow chart showing a procedure of a process to be executed by the PC according to Embodiment 1.
Figure 5:
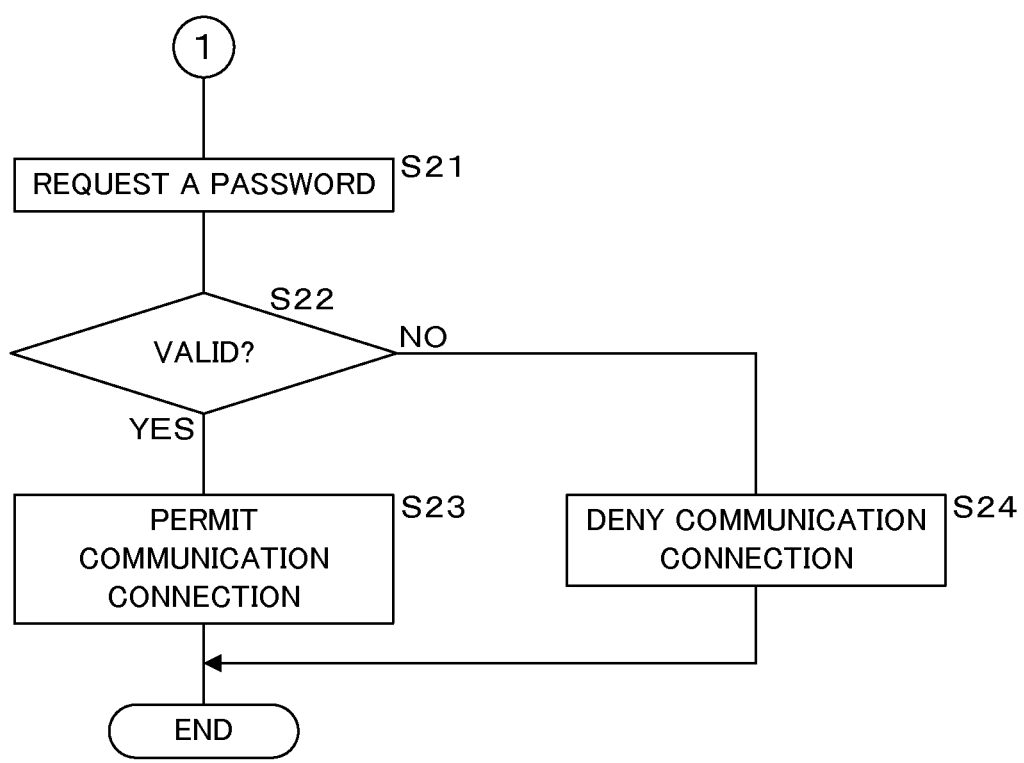
FIG. 5 is a flow chart showing the procedure of the process to be executed by the PC according to Embodiment 1.
Figure 6:
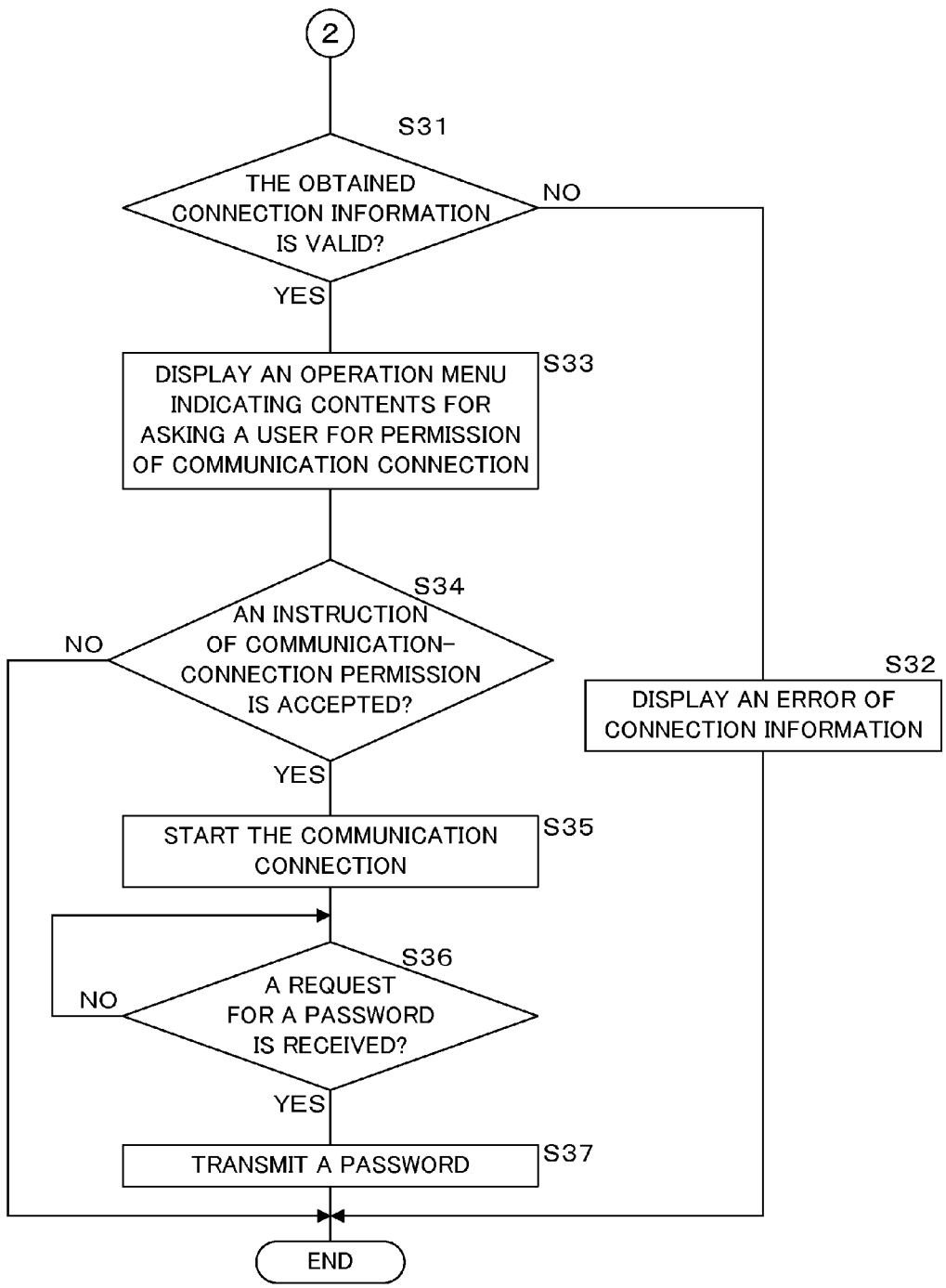
FIG. 6 is a flow chart showing the procedure of the process to be executed by the PC according to Embodiment 1.
Figure 7:
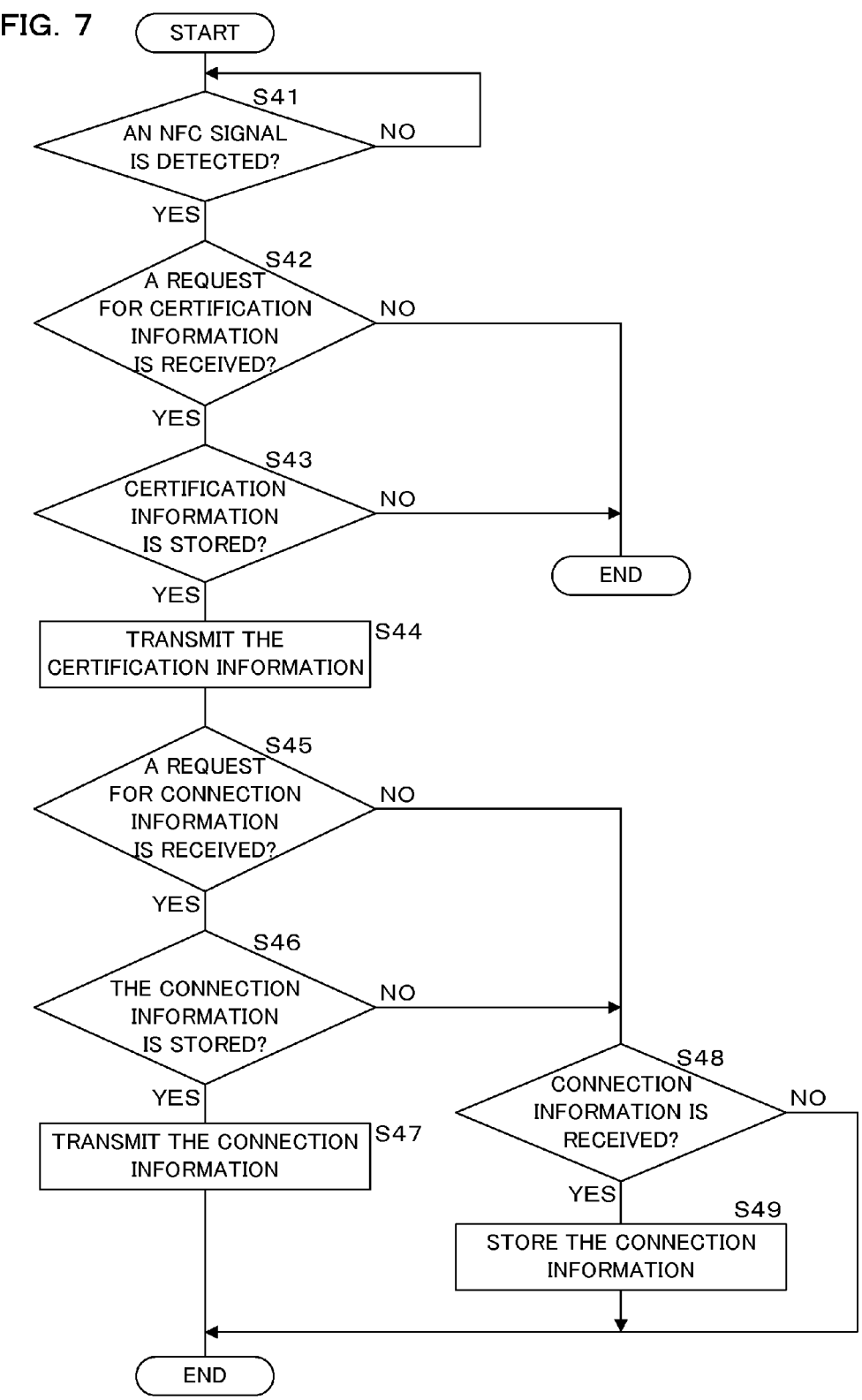
FIG. 7 is a flow chart showing a procedure of a process to be executed by the portable device according to Embodiment 1.

FIGS. 4, 5 and 6 are flow charts showing a procedure of a process to be executed by the PC according to Embodiment 1, and FIG. 7 is a flow chart showing a procedure of a process to be executed by the portable device 2 according to Embodiment 1. As required, the NFC section 16 of the PC 1 tries communication with the portable device 2 by means of NFC, and determines whether or not the portable device 2 is detected due to the fact that communication becomes possible (S101). When a user causes the portable device 2 to approach the NFC section 16 of the PC 1, the NFC section 16 detects the portable device 2. In the portable device 2, the NFC section 23 waits for detection of an NFC signal indicating that the communication has been executed (S41). When the NFC signal is not detected (S41: NO), the NFC section 23 continues waiting of detection of the NFC signal. When the NFC section 16 cannot detect the portable device 2 (S101: NO), the CPU 11 determines whether or not a communication connection request from an external communication apparatus is received (S102). The external communication apparatus is another PC 1, the display apparatus 3, or the image processing apparatus 4. The communication section 17 receives the communication connection request. When the communication connection request is not received (S102: NO), the CPU 11 returns the process to S101.

When the portable device 2 is detected at S101 (S101: YES), the CPU 11 requests certification information to the detected portable device 2 (S103). At S103, the CPU 11 transmits a request for certification information to the portable device 2 via the NFC section 16. In the portable device 2, when the NFC signal is detected (S41: YES), the NFC section 23 waits the request for certification information to be transmitted from the PC 1 (S42). When the request for certification information is not received (S42: NO), the processing section 21 ends the process. When the request for certification information is received (S42: YES), the processing section 21 determine whether or not certification information unique to the portable device 2 is stored in the storage section 22 (S43). When the certification information is not stored (S43: NO), the processing section 21 ends the process. When the certification information is stored (S43: YES), the processing section 21 reads the certification information stored in the storage section 22, and transmits the certification information to the PC 1 via the NFC section 23 (S44).

In the PC 1, the NFC section 16 waits the certification information to be transmitted from the portable device 2 (S104), and when the certification information is not received (S104: NO), the CPU 11 ends the process. When the NFC section 16 receives the certification information transmitted from the portable device 2 (S104: YES), the CPU 11 compares the received certification information with the certification information stored in the storage section 13, and determines whether or not the received certification information is the valid certification information (S105). When the received certification information is not the valid certification information (S105: NO), the CPU 11 causes the display section 15 to display information indicating an authentication error (S106), and ends the process. When the received certification information is the valid certification information (S105: YES), the CPU 11 requests to the portable device 2 connection information required to execute communication connection with another communication apparatus (S107). At S107, the CPU 11 transmits a request for connection information to the portable device 2 via the NFC section 16.

In the PC 1, the NFC section 16 waits the connection information to be transmitted from the portable device 2 (S108), and when the connection information is not received (S108: NO), the PC 1 causes the display section 15 to display an operation menu indicating contents for asking a user to permit transmission to the portable device 2 of connection information unique to the PC 1 (S109). A user who has recognized the operation menu visually operates the operating section 14 to input an instruction of transmission permission or transmission denial. The PC 1 waits acceptance of the instruction of transmission permission by the operating section 14 (S110), and when the instruction of transmission denial is accepted (S110: NO), the CPU 11 ends the process. When the instruction of transmission permission of connection information is accepted by the operating section 14 (S110: YES), the CPU 11 reads the connection information unique to the PC 1 from the storage section 13, transmits the connection information to the portable device 2 via the NFC section 16 (S111), and ends the process.

In the portable device 2, the NFC section 23 waits a request for connection information to be transmitted from the PC 1, after S44 (S45). When the request for connection information is received (S45: YES), the processing section 21 determines whether or not connection information unique to a communication apparatus different from the PC 1 of communicating end is stored in the storage section 22 (S46). When the request for connection information is not received (S45: NO), or when the connection information is not stored (S46: NO), the processing section 21 waits reception, by the NFC section 23, of the connection information to be transmitted from the PC 1 (S48). When the connection information is not received (S48: NO), the processing section 21 ends the process. When the connection information is received (S48: YES), the processing section 21 causes the storage section 22 to store the received connection information (S49), and ends the process. When connection information unique to the communication apparatus different from the PC 1 of communicating end at S46 is stored in the storage section 22 (S46: YES), the processing section 21 reads the connection information from the storage section 22, transmits the connection information to the PC 1 via the NFC section 23 (S47), and ends the process. Note that the processing section 21 may eliminate the transmitted connection information from the storage section 22.

In the PC 1, when a communication connection request from an external communication apparatus is received at S102 (S102: YES), the CPU 11 causes the communication section 17 to transmit request for a password required to execute communication connection to the communication apparatus which has transmitted the communication connection request (S21). The communication apparatus transmits a password according to the request for the password, and the PC 1 receives the password by the communication section 17. Next, the CPU 11 compares the received password with a password contained in unique connection information stored in the storage section 13, and determines whether or not the received password is a valid password (S22). When the received password is the valid password (S22: YES), the CPU 11 permits communication connection with the communication apparatus (S23), and ends the process. At S23, the CPU 11 causes the communication section 17 to transmit information indicating permission of communication connection to the communication apparatus. Thereafter, the communication connection is executed between the PC 1 and the communication apparatus, and transmission/reception of data and various kinds of processes by use of the transmitted/received data are executed. At S22, when the password is not the valid password (S22: NO), the CPU 11 denies communication connection with the communication apparatus (S24), and ends the process. At S24, the CPU 11 causes the communication section 17 to transmit information indicating denial of communication connection to the communication apparatus.

When the NFC section 16 receives the connection information from the portable device 2 at S108 (S108: YES), the CPU 11 determines whether or not the obtained connection information is valid (S31). The obtained connection information is information unique to another communication apparatus. At S31, the CPU 11 determines according to a predetermined rule, such as whether or not an IP address included in the connection information falls within a predetermined range, or whether or not predetermined information used as a basis of invalidity is included in the connection information, or the like. When the connection information is not valid (S31: NO), the CPU 11 causes the display section 15 to display information indicating an error of connection information (S32), and ends the process. When the connection information is valid (S31: YES), the CPU 11 causes the storage section 13 to store the obtained connection information, and causes the display section 15 to display an operation menu indicating contents for asking a user for permission of communication connection with another communication apparatus by use of the obtained connection information (S33). A user operates the operating section 14 to input an instruction of communication-connection permission or communication-connection denial. The PC 1 waits acceptance of the instruction of communication-connection permission by the operating section 14 (S34), and when an instruction of communication-connection denial is accepted (S34: NO), the CPU 11 ends the process. When an instruction of communication-connection permission is accepted by the operating section 14 (S34: YES), the CPU 11 uses the connection information to start the communication connection (S35). At S35, the CPU 11 uses the communication section 17 to access via the communication network 5 a communication apparatus designated by an IP address included in the connection information, for example. Next, the CPU 11 waits a request for a password to be transmitted from a communication apparatus of a communicating end (S36). The request for a password is received by the communication section 17. When the request for a password is not received by the communication section 17 (S36: NO), the CPU 11 continues waiting of the request for a password. When the request for a password is received by the communication section 17 (S36: YES), the CPU 11 causes the communication section 17 to transmit a password contained in connection information unique to the communication apparatus of communicating end to the communication apparatus of communicating end (S37), and ends the process. Thereafter, data is transmitted/received between the PC 1 and the communication apparatus, and various kinds of processes by use of the transmitted/received data are executed.

The above process is executed by a plurality of communication apparatuses which execute communication connection, respectively. A user causes the portable device 2 to approach a first communication apparatus, and the first communication apparatus outputs unique connection information to the portable device 2 by means of NFC, and the portable device 2 obtains the connection information. The user causes the portable device 2 which has obtained the connection information to approach a second communication apparatus that is due to execute communication connection with the first communication apparatus. The portable device 2 outputs connection information unique to the first communication apparatus by means of NFC, and the second communication apparatus obtains the connection information by means of NFC. The second communication apparatus executes communication connection with the first communication apparatus by use of the obtained connection information. Thus, the connection information unique to the first communication apparatus is transferred from the first communication apparatus to the second communication apparatus via the portable device 2 to allow communication connection between the first communication apparatus and the second communication apparatus. For example, data is exchanged via the communication network 5 between two PCs 1. A similar process is executed even when one of two communication apparatuses is the display apparatus 3 or the image processing apparatus 4. The display apparatus 3 and the image processing apparatus 4 are provided with a function of wireless communication by means of NFC, exchange connection information with another communication apparatus via the portable device 2 similarly, and execute communication connection with the communication apparatus. For example, communication connection is executed between the PC 1 and the display apparatus 3, and the PC 1 can cause the display apparatus 3 to display a desired image. For example, communication connection is executed between the PC 1 and the image processing apparatus 4, and the PC 1 executes a process of causing the image processing apparatus 4 to form a desired image or a process of reading data stored in the image processing apparatus 4. Moreover, three or more communication apparatuses execute the process, respectively, to allow communication connection between one communication apparatus and each of a plurality of other communication apparatuses, or mutual communication connection among three or more communication apparatuses.

As explained above in detail, in this Embodiment, connection information is transferred among a plurality of communication apparatuses via the portable device 2, and communication connection by use of the connection information is executed among the plurality of communication apparatuses. Connection information is transferred from one communication apparatus to the portable device 2 by means of NFC and the connection information is also transferred from the portable device 2 to another communication apparatus by means of NFC, thereby time and effort required for a user are reduced, as compared with a method of manually inputting connection information to a communication apparatus by a user. A user only causes the portable device 2 to approach a communication apparatus to transfer connection information so that a user can perform a task of communication connection without having knowledge about connection information. Accordingly, communication connection can be easily executed among a plurality of communication apparatuses.

(Embodiment 2)

Figure 8:
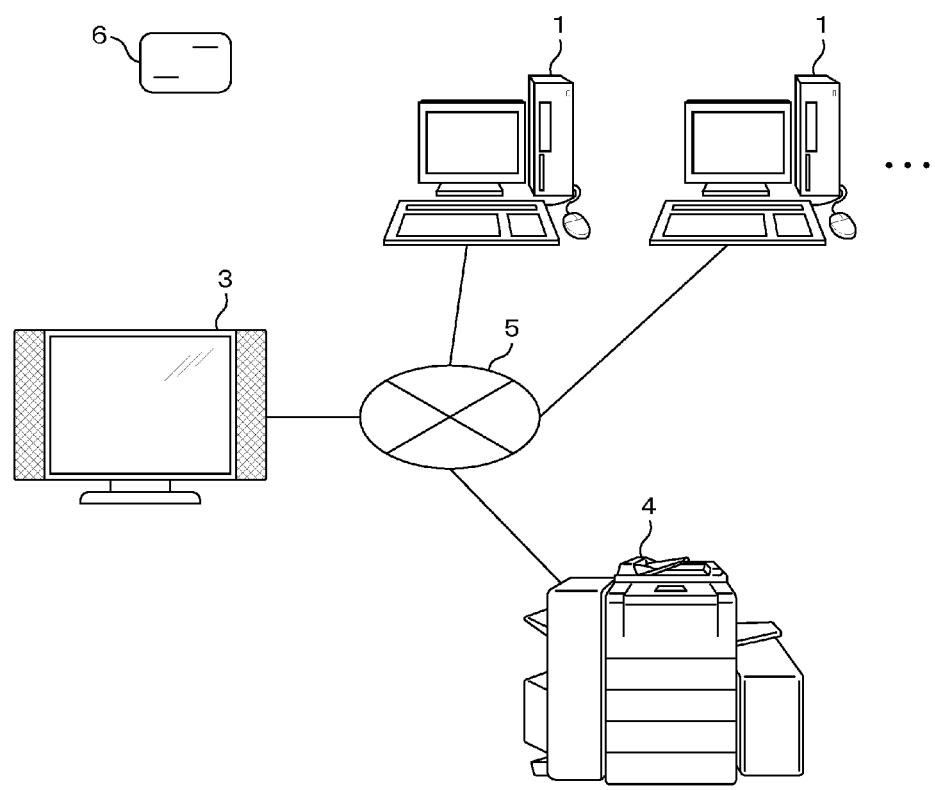
FIG. 8 is a conceptual diagram showing a configuration of a communication system according to Embodiment 2.

In this Embodiment, an IC (Integrated Circuit) card is used as a portable-type information processing device. FIG. 8 is a conceptual diagram showing a configuration of a communication system according to Embodiment 2. The communication system has a configuration in which the portable device 2 in the communication system according to Embodiment 1 is replaced with an IC card 6. A configuration of the communication system other than the IC card 6 is the same as that in Embodiment 1.

Figure 9:
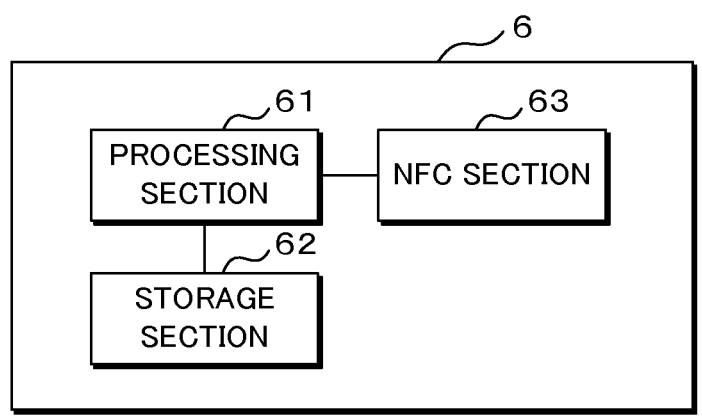
FIG. 9 is a block diagram showing an internal configuration of an IC card.

FIG. 9 is a block diagram showing an internal configuration of the IC card 6. The IC card 6 comprises a processing section 61 which executes an information process required for the IC card 6. The processing section 61 includes a calculating section which executes calculations, a RAM which stores information associated with the calculations, a memory which stores programs required for the calculations, and the like. The IC card 6 further comprises a storage section 62 which stores information, and an NFC section 63 which communicates by wireless by means of NFC. The NFC section 63 includes an antenna for NFC and a signal processing section. The storage section 62 stores certification information unique to the IC card 6, which is required to communicate with a communication apparatus by means of NFC.

The IC card 6 executes a process similar to the process to be executed by the portable device 2 in Embodiment 1, and a communication apparatus such as the PC 1 executes the similar process as that in Embodiment 1. In this Embodiment, a user causes the IC card 6 to approach a first communication apparatus, the first communication apparatus outputs unique connection information to the IC card 6 by means of NFC, and the IC card 6 obtains the connection information. Also, a user causes the IC card 6 which has obtained the connection information to approach a second communication apparatus. The IC card 6 outputs the connection information unique to the first communication apparatus by means of NFC, and the second communication apparatus obtains the connection information by means of NFC. The second communication apparatus uses the obtained connection information to execute communication connection with the first communication apparatus. Thus, connection information unique to the first communication apparatus is transferred from the first communication apparatus to the second communication apparatus via the IC card 6 so as to execute communication connection among the plurality of communication apparatuses. Also in this Embodiment, since connection information is transferred by means of NFC, time and effort required for a user are reduced. Similarly, a user can perform a task of communication connection without having knowledge about connection information. Accordingly, communication connection can be easily executed among a plurality of communication apparatuses.

(Embodiment 3)

Figure 10:
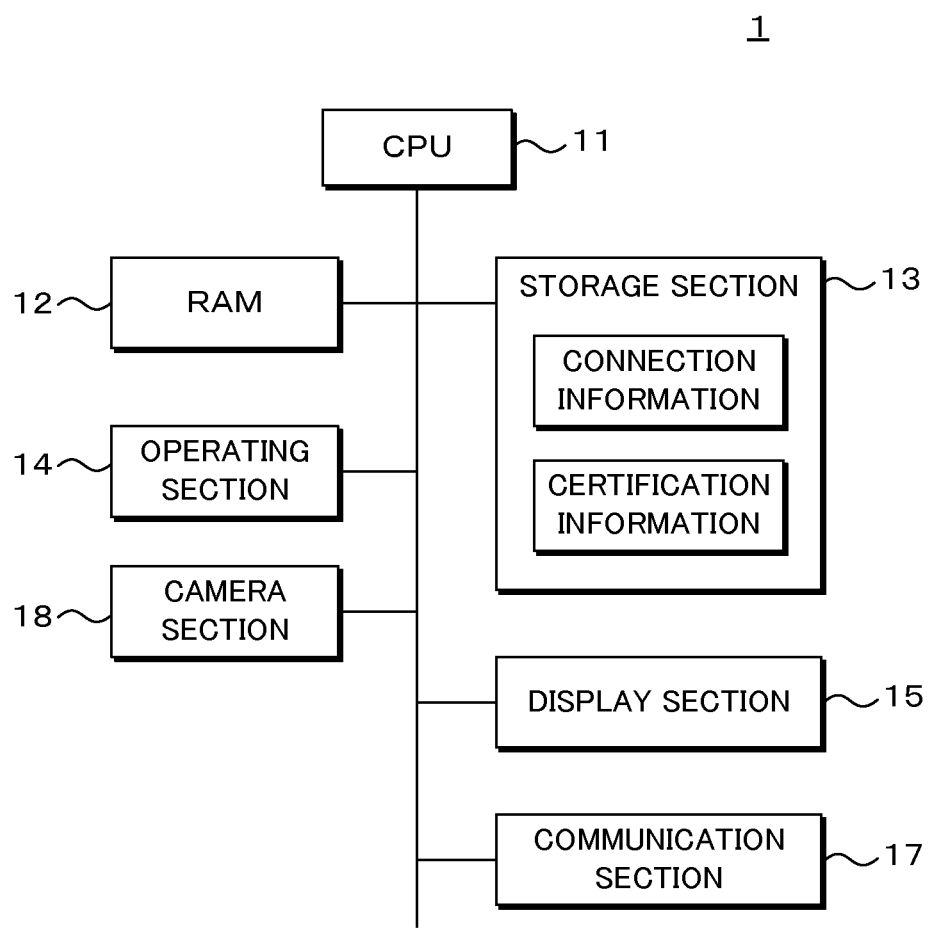
FIG. 10 is a block diagram showing an internal configuration of a PC according to Embodiment 3.
Figure 11:
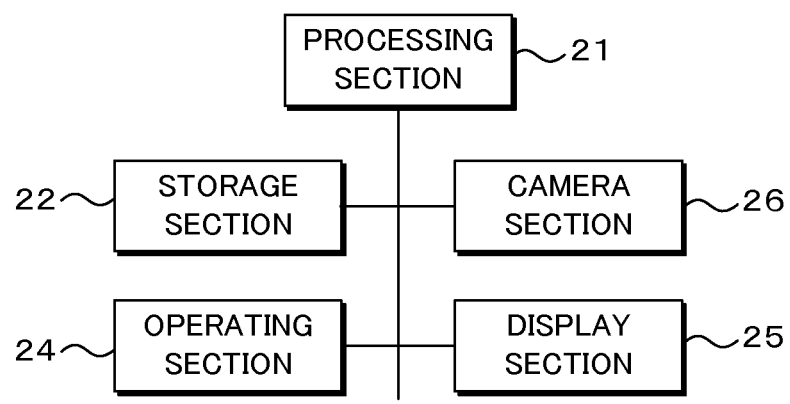
FIG. 11 is a block diagram showing an internal configuration of a portable device according to Embodiment 3.

In Embodiment 3, a graphic code, such as a one-dimensional bar code or a two-dimensional code, which represents connection information in a graphic pattern is displayed, thereby connection information required to execute communication connection among communication apparatuses is outputted. A configuration of a communication system according to Embodiment 3 is the same as that in Embodiment 1. FIG. 10 is a block diagram showing an internal configuration of a PC 1 according to Embodiment 3. The PC 1 comprises a CPU 11, a RAM 12, a storage section 13, an operating section 14, a display section 15, and a communication section 17. The operating section 14 may include a touch panel combined with the display section 15. The PC 1 further comprises a camera section 18 which captures the external. FIG. 11 is a block diagram showing an internal configuration of a portable device 2 according to Embodiment 3. The portable device 2 comprises a processing section 21, a storage section 22, an operating section 24, and a display section 25. The operating section 24 may include a touch panel. Also, the portable device 2 comprises a camera section 26 which captures the external.

Figure 12:
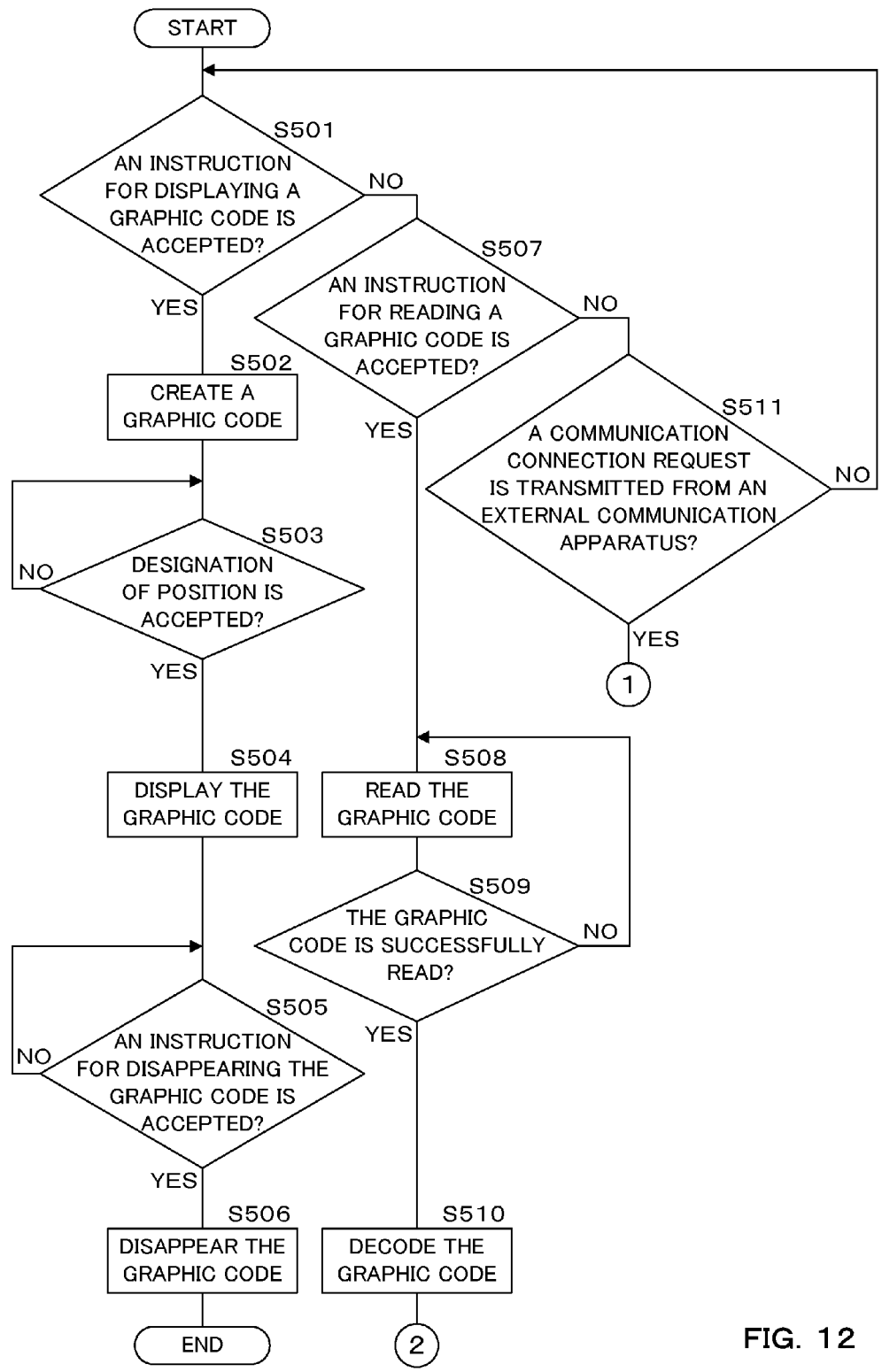
FIG. 12 is a flow chart showing a procedure of a process to be executed by the PC according to Embodiment 3.
Figure 13:
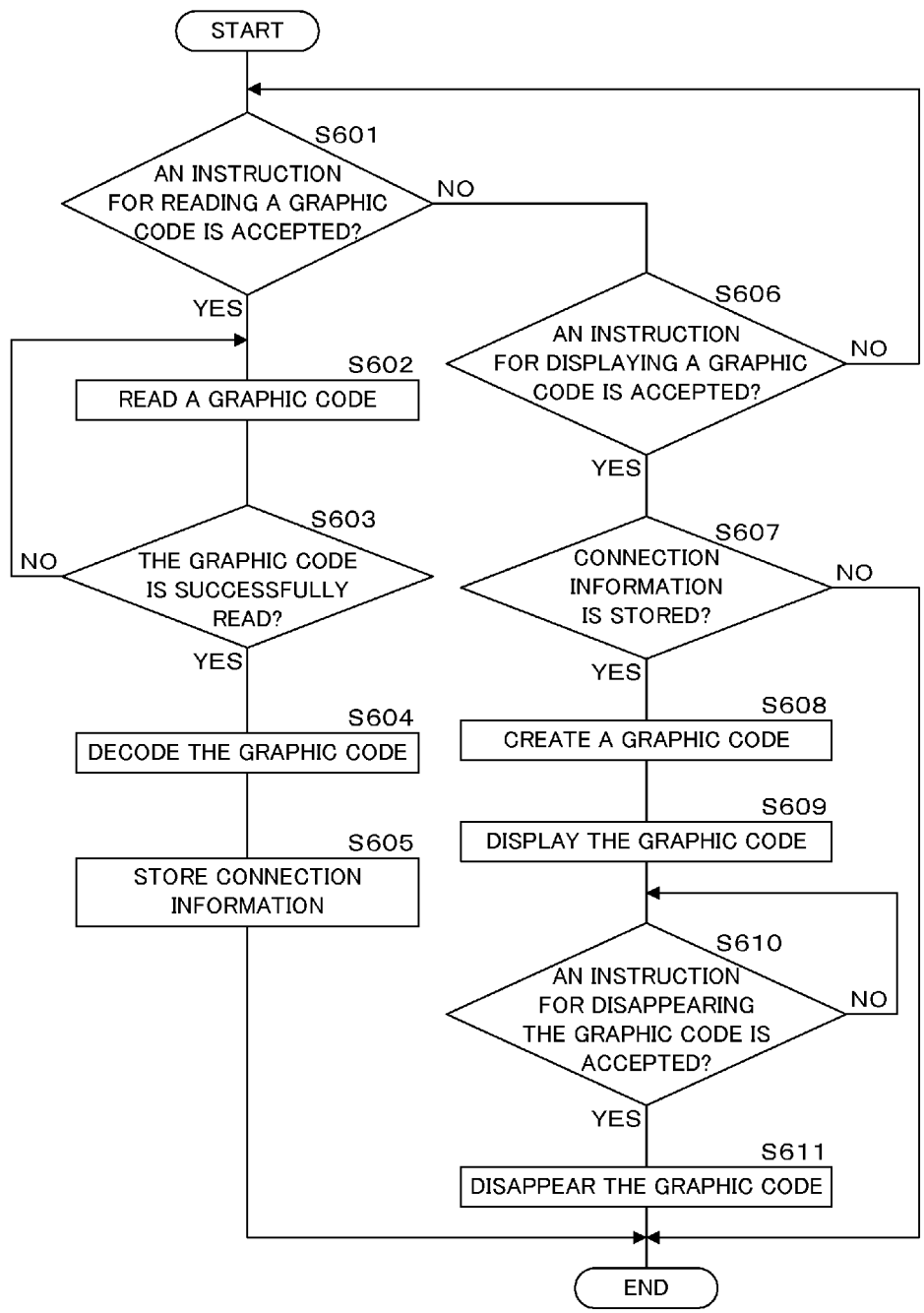
FIG. 13 is a flow chart showing a procedure of a process to be executed by the portable device according to Embodiment 3.

FIG. 12 is a flow chart showing a procedure of a process to be executed by the PC 1 according to Embodiment 3, and FIG. 13 is a flow chart showing a procedure of a process to be executed by the portable device 2 according to Embodiment 3. The PC 1 waits an instruction for displaying a graphic code representing connection information in a graphic pattern (S501). A user operates the operating section 14 to input the instruction for displaying a graphic code, and the PC 1 accepts the instruction by the operating section 14. When the instruction for displaying a graphic code is accepted by the operating section 14 (S501: YES), the CPU 11 reads connection information unique to the PC 1 from the storage section 13, and creates a graphic code, such as a one-dimensional bar code or a two-dimensional code, which represents connection information in a graphic pattern (S502). Next, the PC 1 waits designation of a position at which the graphic code should be displayed, on a screen of the display section 15 (S503). A user operates the operating section 14 to designate the position, and the PC 1 accepts the designated position by the operating section 14. If the operating section 14 includes a touch panel, a user touches a certain position of the touch panel to designate a position. When the position is not designated (S503: NO), the CPU 11 continues waiting of the designation of position. When the operating section 14 accepts the designation of position (S503: YES), the CPU 11 causes the display section 15 to display the graphic code (S504). Note that the PC 1 may omit a process of S503 and it may execute a process of displaying the graphic code at a predetermined position on the screen of the display section 15.

The portable device 2 waits an instruction for reading a graphic code (S601). A user operates the operating section 24 to input the instruction for reading a graphic code, and the portable device 2 accepts the instruction by the operating section 24. When the operating section 24 accepts the instruction for reading a graphic code (S601: YES), the processing section 21 causes the camera section 26 to read a graphic code displayed on the display section 15 of the PC 1 (S602). The processing section 21 determines whether or not the graphic code is successfully read (S603), and when the graphic code is not successfully read (S603: NO), the processing section 21 returns the process to S602. When the graphic code is successfully read (S603: YES), the processing section 21 decodes the graphic code read by the camera section 26 (S604). The processing section 21 decodes the graphic code at S604, thereby the portable device 2 obtains connection information unique to the PC 1. Next, the processing section 21 causes the storage section 22 to store the obtained connection information (S605), and ends the process.

In the PC 1, the CPU 11 waits an instruction for disappearing the graphic code (S505). A user operates the operating section 14 to input the instruction for disappearing the graphic code, and the PC 1 accepts the instruction by the operating section 14. When the instruction for disappearing the graphic code is not accepted (S505: NO), the CPU 11 continues waiting of the instruction for disappearing the graphic code. When the operating section 14 accepts the instruction for disappearing the graphic code (S505: YES), the CPU 11 causes the display section 15 to disappear the displayed graphic code (S506), and ends the process.

When the instruction for displaying a graphic code is not accepted at S501 (S501: NO), the CPU 11 waits an instruction for reading a graphic code input by a user operating the operating section 14 (S507). When the instruction for reading a graphic code is not accepted (S507: NO), the CPU 11 determines whether or not a communication connection request is transmitted from an external communication apparatus (S511). When the communication connection request is not transmitted (S511: NO), the CPU 11 returns the process to S501. When the communication connection request is transmitted from an external communication apparatus (S511: YES), the CPU 11 executes the similar process as S21 to S24 in Embodiment 1.

In the portable device 2, when the instruction for reading a graphic code is not accepted at S601 (S601: NO), the processing section 21 waits an instruction for displaying a graphic code which represents connection information unique to the communication apparatus in a graphic pattern (S606). A user operates the operating section 24 to input the instruction for displaying a graphic code, and the portable device 2 accepts the instruction by the operating section 24. When the instruction for displaying a graphic code is not accepted (S606: NO), the processing section 21 returns the process to S601. When the operating section 24 accepts the instruction for displaying a graphic code (S606: YES), the processing section 21 determines whether or not the connection information unique to a communication apparatus is stored in the storage section 22 (S607). When the connection information is not stored (S607: NO), the processing section 21 ends the process. When the connection information is stored (S607: YES), the processing section 21 creates a graphic code, such as a one-dimensional bar code or a two-dimensional code, which represents in a graphic pattern the connection information stored in the storage section 22 (S608), and causes the display section 25 to display the graphic code (S609).

In the PC 1, when the instruction for reading a graphic code is accepted (S507: YES), the CPU 11 causes the camera section 18 to read the graphic code displayed by the display section 25 of the portable device 2 (S508). The CPU 11 determines whether or not the graphic code is successfully read (S509), and when the graphic code is not successfully read (S509: NO), the CPU 11 returns the process to S508. When the graphic code is successfully read (S509: YES), the processing section 21 decodes the graphic code read by the camera section 18 (S510). Since the processing section 21 decodes the graphic code at S510, the PC 1 obtains connection information unique to another communication apparatus. Next, the CPU 11 executes the similar process as S31 to S37 in Embodiment 1.

The portable device 2 waits an instruction for disappearing the graphic code input by the user operating the operating section 24 (S610). When the instruction for disappearing the graphic code is not accepted (S610: NO), the processing section 21 continues waiting of the instruction for disappearing the graphic code. When the instruction for disappearing the graphic code is accepted by the operating section 24 (S610: YES), the processing section 21 causes the display section 25 to disappear the displayed graphic code (S611), and ends the process. Note that the processing section 21 may eliminate connection information outputted in a form of a graphic code from the storage section 22.

The above process is executed by a plurality of communication apparatuses which execute communication connection, respectively. A user causes the portable device 2 to approach a display section of a first communication apparatus, and the portable device 2 reads a graphic code displayed by the display section, thereby the portable device 2 obtains connection information unique to the first communication apparatus. Also, the user causes a camera section of a second communication apparatus to approach a display section of the portable device 2 which has obtained the connection information, and the second communication apparatus reads a graphic code displayed by the display section of the portable device 2, thereby the second communication apparatus obtains connection information for executing communication connection to the first communication apparatus. Thus, also in this Embodiment, connection information unique to the first communication apparatus is transferred from the first communication apparatus to the second communication apparatus via the portable device 2 so as to execute communication connection between the first communication apparatus and the second communication apparatus. A similar process is executed even when one of the communication apparatuses is the display apparatus 3 or the image processing apparatus 4. The display apparatus 3 and the image processing apparatus 4 comprise the display section and the camera section, respectively, and they exchange connection information with another communication apparatus via the portable device 2 similarly to execute communication connection with the communication apparatus.

As explained above in detail, in this Embodiment, connection information is transferred among a plurality of communication apparatuses via the portable device 2, and communication connection by use of the connection information is executed among the plurality of communication apparatuses. The connection information is transferred from one communication apparatus to the portable device 2 by means of display and reading of a graphic code and the connection information is also transferred from the portable device 2 to another communication apparatus, thereby time and effort required for a user are reduced, as compared with a method of manually inputting connection information to a communication apparatus by a user. Moreover, a user can perform a task of communication connection without having knowledge about connection information. Accordingly, communication connection can be easily executed among a plurality of communication apparatuses.

Note that the communication system according to the present invention may be a form combined with Embodiments 1 and 2. For example, the communication system may transfer connection information from a communication apparatus to the portable device 2 by means of NFC, and transfer the connection information from the portable device 2 to a communication apparatus by means of display and reading of a graphic code. Also for example, the communication system may transfer connection information from a communication apparatus to the portable device 2 by means of display and reading of a graphic code, and transfer the connection information from the portable device 2 to a communication apparatus by means of NFC. Moreover, although the PC 1, the display apparatus 3 and the image processing apparatus 4 are provided in the communication system in the above Embodiments 1 to 3, the communication system is not limited to this. The communication system only has to comprise a plurality of communication apparatuses, and it may not comprise the display apparatus 3 or the image processing apparatus 4.

(Embodiment 4)

Figure 14:
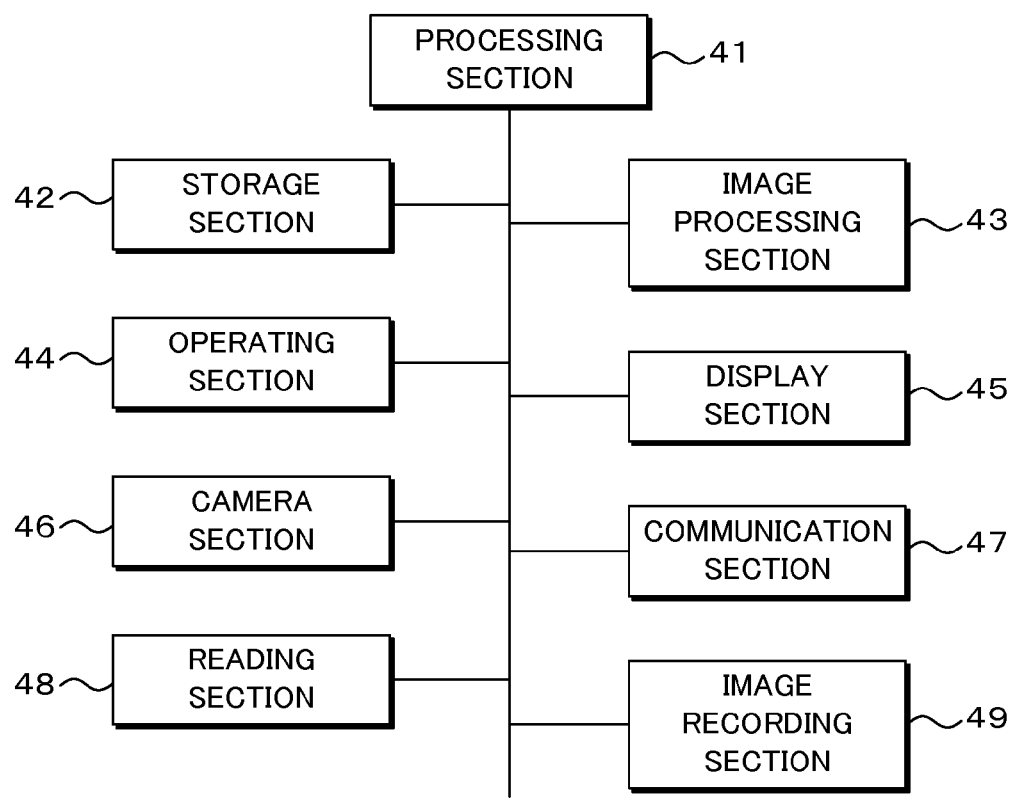
FIG. 14 is a block diagram showing an internal configuration of an image processing apparatus according to Embodiment 4.

In Embodiment 4, the image processing apparatus 4 records a graphic pattern, thereby connection information required to execute communication connection among communication apparatuses is outputted. A configuration of a communication system according to Embodiment 4 is the same as that in Embodiment 1. Configurations of the PC 1 and the portable device 2 are the same as those in Embodiment 3. FIG. 14 is a block diagram showing an internal configuration of an image processing apparatus 4 according to Embodiment 4. The image processing apparatus 4 comprises a control section 41 which controls operations of respective sections, a storage section 42 which stores data, an operating section 44 which accepts an operation from a user, a display section 45 which displays an image, a camera section 46 which captures the external, and a communication section 47 which communicates via the communication network 5. The control section 41 includes a processor which executes calculations, and a memory which stores programs required for the calculations, various kinds of data and temporary information associated with the calculations. The storage section 42 stores connection information unique to the image processing apparatus 4. The image processing apparatus 4 further comprises an image processing section 43 which processes an image, a reading section 48 which reads an image optically, and an image recording section 49 which records an image on a recording sheet.

Figure 15:
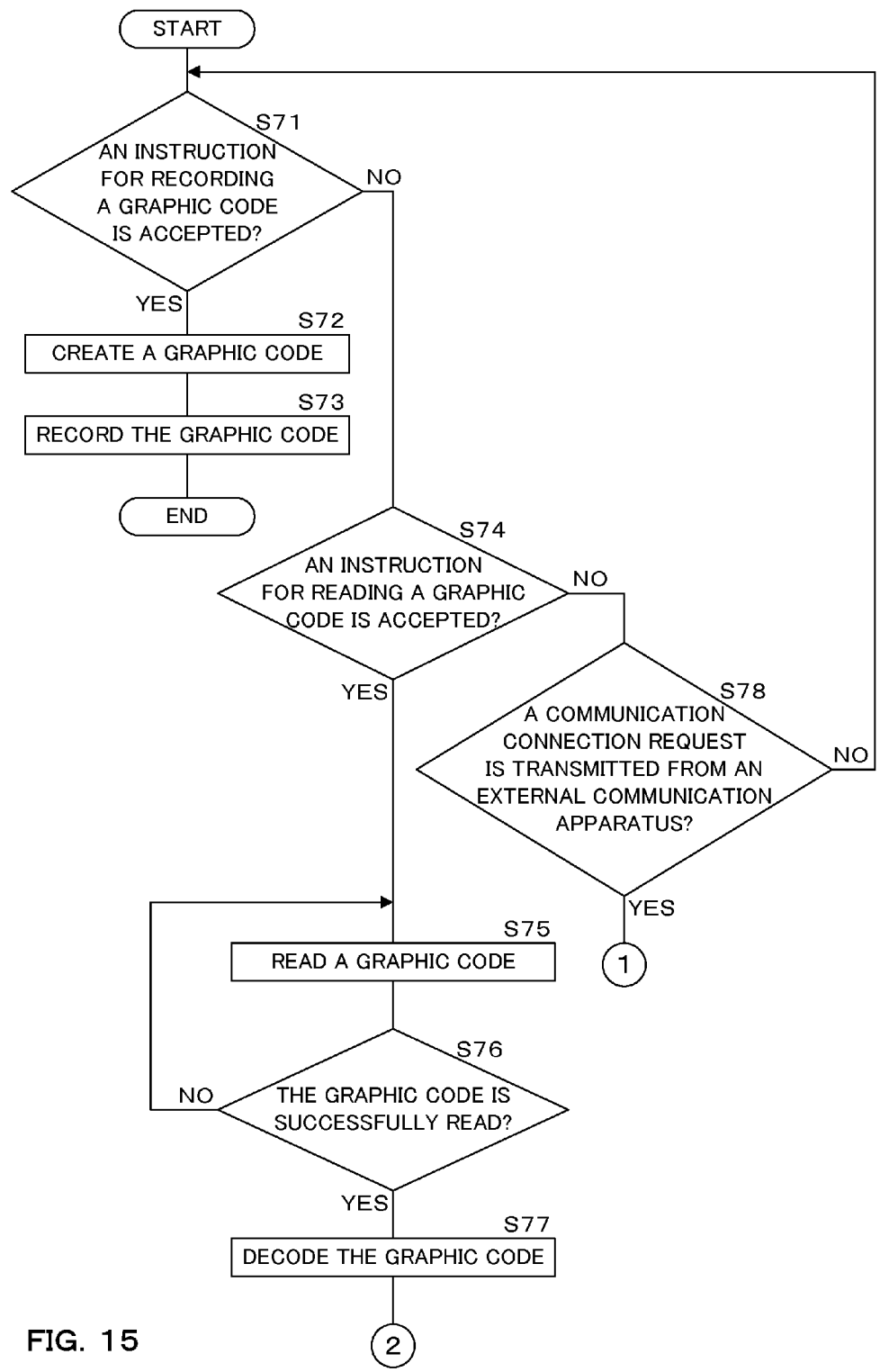
FIG. 15 is a flow chart showing a procedure of a process to be executed by the image processing apparatus according to Embodiment 4.

FIG. 15 is a flow chart showing a procedure of a process to be executed by the image processing apparatus 4 according to Embodiment 4. The control section 41 waits an instruction for recording a graphic code representing connection information in a graphic pattern (S71). A user operates the operating section 44 to input the instruction for recording a graphic code, and the image processing apparatus 4 accepts the instruction by the operating section 44. When the operating section 44 accepts the instruction for recording a graphic code (S71: YES), the control section 41 reads connection information unique to the image processing apparatus 4 from the storage section 42, and causes the image processing section 43 to create a graphic code representing the connection information in a graphic pattern (S72). Next, the control section 41 causes the image recording section 49 to record the created graphic code on a recording sheet (S73), and ends the process. Another communication apparatus obtains connection information unique to the image processing apparatus 4 by use of the recorded graphic code. For example, a user causes the PC 1 to read the graphic code recorded on the recording sheet, and the PC 1 decodes the read graphic code to obtain connection information.

When the instruction for recording a graphic code is not accepted at S71 (S71: NO), the image processing apparatus 41 waits an instruction for reading a graphic code by a user operating the operating section 44 (S74). When the instruction for reading a graphic code is not accepted (S74: NO), the control section 41 determines whether or not a communication connection request is transmitted from an external communication apparatus (S78). When the communication connection request is not transmitted (S78: NO), the control section 41 returns the process to S71. When the communication connection request is transmitted from an external communication apparatus (S78: YES), the control section 41 executes the similar process as S21 to S24 in Embodiment 1.

Similarly to Embodiment 3, another communication apparatus, such as the PC 1, displays a graphic code to output connection information, and the portable device 2 reads the graphic code and decodes it to obtain connection information. Also, the portable device 2 causes the display section 25 to display the graphic code representing the connection information in a graphic pattern. In the image processing apparatus 4, when the instruction for reading a graphic code is accepted (S74: YES), the control section 41 causes the camera section 46 to read the graphic code displayed by the display section 25 of the portable device 2 (S75). The control section 41 determines whether or not the graphic code is successfully read (S76), and when the graphic code is not successfully read (S76: NO), the control section 41 returns the process to S75. When the graphic code is successfully read (S76: YES), the processing section 21 decodes the graphic code read by the camera section 46 (S77). Since the processing section 21 decodes the graphic code at S77, the image processing apparatus 4 obtains connection information unique to another communication apparatus. Next, the control section 41 executes the similar process as S31 to S37 in Embodiment 1.

Since the above process is executed, connection information is transferred between the image processing apparatus 4 and another communication apparatus, and the communication apparatus can execute communication connection with the image processing apparatus 4. For example, communication connection is executed between the PC 1 and the image processing apparatus 4, and the PC 1 executes a process of causing the image processing apparatus 4 to form a desired image or a process of reading data stored in the image processing apparatus 4. Thus, also in this Embodiment, connection information is transferred among a plurality of communication apparatuses so as to execute communication connection by use of the connection information among the plurality of communication apparatuses. Connection information is transferred from one communication apparatus to another communication apparatus by means of record and reading of a graphic code, thereby time and effort required for a user are reduced, as compared with a method of manually inputting connection information to a communication apparatus by a user. Moreover, a user can perform a task of communication connection without having knowledge about connection information. Accordingly, communication connection can be easily executed among a plurality of communication apparatuses.

Note that the communication system may have a form in which the PC 1 or the display apparatus 3 further comprises an image recording section and causes the image recording section to record a graphic code on a recording sheet to output connection information. In this form, the image processing apparatus 4 may read a graphic code recorded on the recording sheet by the reading section 48, and decode the read graphic code to obtain connection information.

Although the image processing apparatus 4 is a multi-function peripheral in the above Embodiments 1 to 4, the image processing apparatus 4 is not limited to a multi-function peripheral as long as the image processing apparatus 4 has a function of recording an image. For example, the image processing apparatus 4 may be a printer. Moreover, although the PC 1, the display apparatus 3 and the image processing apparatus 4 are described as an example of a communication apparatus in Embodiments 1-4, the communication apparatus according to the present invention may be another type of apparatus.

As described above, the communication system according to the present invention is characterized by comprising: a plurality of communication apparatuses (1, 3, 4); and a portable-type information processing device (2, 6), one communication apparatus (1, 3, 4) includes: a first storage section storing connection information unique to the one communication apparatus (1, 3, 4) required for another communication apparatus (1, 3, 4) of the plurality of communication apparatuses to execute communication connection; and a first output section for outputting the connection information stored in the first storage section to the information processing device (2, 6) in a non-contact manner, the information processing device (2, 6) includes: a first obtaining section for obtaining the connection information outputted from the one communication apparatus (1, 3, 4), a second storage section for storing the connection information obtained by the first obtaining section; and a second output section for outputting the connection information stored in the second storage section to said another communication apparatus (1, 3, 4) in a non-contact manner, and said another communication apparatus (1, 3, 4) includes: a second obtaining section for obtaining the connection information outputted from the information processing device (2, 6); and a communication connection section for using the connection information obtained by the second obtaining section to execute communication connection with the one communication apparatus (1, 3, 4).

The communication system according to the present invention is characterized in that the first output section transmits the connection information to the information processing device (2, 6) by means of short-range wireless communication to output the connection information, and the first obtaining section receives the connection information from the one communication apparatus (1, 3, 4) by means of short-range wireless communication to obtain the connection information.

The communication system according to the present invention is characterized in that the one communication apparatus (1, 3, 4) further includes a display section (15), the first output section causes the display section (15) to display a graphic code representing the connection information in a graphic pattern to output the connection information, the information processing device (2) further includes a camera section (26), and the first obtaining section causes the camera section (26) to capture the graphic code displayed by the display section (15) and decodes the captured graphic code to obtain the connection information.

The communication system according to the present invention is characterized in that the second output section transmits the connection information to said another communication apparatus (1, 3, 4) by means of short-range wireless communication to output the connection information, and the second obtaining section receives the connection information from the information processing device (2, 6) by means of short-range wireless communication to obtain the connection information.

The communication system according to the present invention is characterized in that the information processing device (2) further includes a display section (25), the second output section causes the display section (25) to display a graphic code representing the connection information in a graphic pattern to output the connection information, said another communication apparatus (1, 3, 4) further includes a camera section (18, 46), and the second obtaining section causes the camera section (18, 46) to capture the graphic code displayed by the display section (25) of the information processing device (2) and decodes the captured graphic code to obtain the connection information.

The communication apparatus according to the present invention is characterized in that a communication apparatus (1, 3, 4) which communicates with another communication apparatus (1, 3, 4) comprises: a storage section storing connection information unique to the communication apparatus itself required for said another communication apparatus (1, 3, 4) to execute communication connection; an output section for outputting the connection information stored in the storage section to an external portable-type information processing device (2, 6) in a non-contact manner; an obtaining section for obtaining connection information unique to said another communication apparatus (1, 3, 4) and outputted from the information processing device (2, 6); and a communication connection section for using the connection information obtained by the obtaining section to execute communication connection with said another communication apparatus (1, 3, 4).

The communication connection method according to the present invention is characterized in that a method of executing communication connection among a plurality of communication apparatuses (1, 3, 4) comprises: one communication apparatus (1, 3, 4) using a portable-type information processing device (2, 6) to output to the information processing device (2, 6) in a non-contact manner connection information unique to the one communication apparatus (1, 3, 4) required for another communication apparatus (1, 3, 4) of the plurality of communication apparatuses to execute communication connection; the information processing device (2, 6) obtaining the connection information outputted from the one communication apparatus (1, 3, 4), storing the obtained connection information, and outputting the stored connection information to said another communication apparatus (1, 3, 4) in a non-contact manner; and said another communication apparatus (1, 3, 4) obtaining the connection information outputted from the information processing device (2, 6), and using the obtained connection information to execute communication connection with the one communication apparatus (1, 3, 4).

In the present invention, the communication system comprises a plurality of communication apparatuses (1, 3, 4) and a portable-type information processing device (2, 6). A user causes the information processing device (2, 6) to approach one communication apparatus (1, 3, 4), the one communication apparatus (1, 3, 4) outputs unique connection information to the information processing device (2, 6), and the information processing device (2, 6) obtains the connection information. Moreover, a user causes the information processing device (2, 6) which has obtained the connection information to approach another communication apparatus (1, 3, 4). The information processing device (2, 6) outputs connection information unique to the one communication apparatus (1, 3, 4), and another communication apparatus (1, 3, 4) obtains the connection information. The communication apparatus (1, 3, 4) uses the obtained connection information to execute communication connection with the one communication apparatus (1, 3, 4). Thus, connection information unique to one communication apparatus (1, 3, 4) is transferred to another communication apparatus (1, 3, 4) via the information processing device (2, 6), so as to execute communication connection among a plurality of communication apparatuses (1, 3, 4).

In the present invention, connection information is transferred from a communication apparatus (1, 3, 4) to an information processing device (2, 6) by means of short-range wireless communication. The information processing device (2, 6) is caused to approach the communication apparatus (1, 3, 4) so as to easily transfer connection information.

In the present invention, a communication apparatus (1, 3, 4) causes a display section (15) to display a graphic code to output connection information, the information processing device (2) causes a camera section (26) to capture the graphic code and decodes it to obtain connection information. Connection information can be easily transferred by means of display and reading of a graphic code.

In the present invention, connection information is transferred from an information processing device (2, 6) to a communication apparatus (1, 3, 4) by means of short-range wireless communication. The information processing device (2, 6) is caused to approach the communication apparatus (1, 3, 4) so as to easily transfer connection information.

In the present invention, an information processing device (2) causes a display section (25) to display a graphic code to output connection information, and a communication apparatus (1, 3, 4) causes a camera section (18, 46) to capture the graphic code and decodes it to obtain connection information. Connection information can be easily transferred by means of display and reading of a graphic code.

As this invention may be embodied in several forms without departing from the spirit of essential characteristics thereof, the present embodiment is therefore illustrative and not restrictive, since the scope of the invention is defined by the appended claims rather than by the description preceding them and all changes that fall within metes and bounds of the claims, or equivalence of such metes and bounds thereof are therefore intended to be embraced by the claims.

What is claimed is:

1. A communication system, comprising:
a plurality of communication apparatuses; and
a portable information processing device,
wherein one communication apparatus includes:
a first display section;
a first storage section storing connection information that: (i) is unique to the one communication apparatus, (ii) is required for another communication apparatus of the plurality of communication apparatuses to execute communication connection by a predetermined communication method, and (iii) includes information designating the one communication apparatus and a password; and
a first output section that outputs the connection information stored in the first storage section in a method different from the predetermined communication method, by displaying, on the first display section, a first graphic code representing the connection information in a first graphic pattern, the information processing device includes:
a first camera section that captures the first graphic code;
a second display section;
a first obtaining section that obtains the connection information outputted from the one communication apparatus in a method different from the predetermined communication method, by accepting the first graphic code captured by the first camera section and decoding the first graphic code;
a second storage section that stores the connection information obtained by the first obtaining section; and
a second output section that outputs the connection information stored in the second storage section in a method different from the predetermined communication method, by displaying, on the second display section, a second graphic code representing the connection information in a second graphic pattern, and said another communication apparatus includes:
a second camera section that captures the second graphic code;
a second obtaining section that obtains the connection information outputted from the information processing device in a method different from the predetermined communication method, by accepting the second graphic code captured by the second camera section and decoding the second graphic code; and
a communication connection section that uses the connection information obtained by the second obtaining section to execute communication connection with the one communication apparatus by the predetermined communication method.

2. A communication apparatus, comprising:
a display section;
a storage section storing first connection information that: (i) is unique to the communication apparatus itself, (ii) is required for a first other communication apparatus to execute communication connection by a predetermined communication method, and (iii) includes information designating the one communication apparatus and a password;
an output section that outputs the first connection information stored in the storage section in a method different from the predetermined communication method, by displaying, on the display section, a first graphic code representing the first connection information in a first graphic pattern;
a camera section that captures a second graphic code which is representing a second connection information in a second graphic pattern and which is displayed by an external information processing device which captures and decodes a third graphic code representing the second connection information, the second connection information being unique to a second other communication apparatus and including information designating the second other communication apparatus and a password;

an obtaining section that obtains the second connection information outputted from the information processing device in a method different from the predetermined communication method, by accepting the second graphic code captured by the camera section and decoding the second graphic code; and a communication connection section that uses the second connection information obtained by the obtaining section to execute communication connection with the second other communication apparatus by the predetermined communication method.

3. A method of executing communication connection among a plurality of communication apparatuses, comprising:

a step of one communication apparatus outputting connection information in a method different from a predetermined communication method, by displaying a first graphic code representing the connection information in a first graphic pattern, the connection information: (i) being unique to the one communication apparatus, (ii) being required for another communication apparatus of the plurality of communication apparatuses to execute communication connection by the predetermined communication method, and (iii) including information designating the one communication apparatus and a password;

a step of a portable information processing device obtaining the connection information in a method different from the predetermined communication method, by capturing the first graphic code displayed by the one communication apparatus and decoding the first graphic code;

a step of the information processing device storing the obtained connection information;

a step of the information processing device outputting the connection information in a method different from the predetermined communication, by displaying a second graphic code representing the stored connection information in a second graphic pattern;

a step of said another communication apparatus obtaining the connection information in a method different from the predetermined communication method, by capturing the second graphic code displayed by the information processing device and decoding the second graphic code; and a step of said another communication apparatus using the obtained connection information to execute communication connection with the one communication apparatus by the predetermined communication method.

4. The communication system according to claim 1, wherein the one communication apparatus further includes:

an accepting section that accepts a designation of a position at which the first graphic code is to be displayed on a screen of the first display section, and the first output section displays, on the first display section, the first graphic code when the accepting section accepts the designation of the position.

5. The communication apparatus according to claim 2, further comprising:

an accepting section that accepts a designation of a position at which the first graphic code is to be displayed on a screen of the display section, wherein the output section displays, on the display section, the first graphic code when the accepting section accepts the designation of the position.

6. The method according to claim 3, further comprising:

a step of the one communication apparatus accepting a designation of a position at which the first graphic code is to be displayed on a screen, and wherein the one communication apparatus displays the first graphic code when the designation of the position is accepted.

* * * * *